US012451709B2

(12) United States Patent
Oyler et al.

(10) Patent No.: US 12,451,709 B2
(45) Date of Patent: Oct. 21, 2025

(54) ELECTRIC TOOTHBRUSH AND CHARGING DOCK

(71) Applicant: Auraglow LLC, Stamford, CT (US)

(72) Inventors: Beau Oyler, Stamford, CT (US); Kieran W. Moriarty, Stamford, CT (US); Jaclyn E. Lowery, Stamford, CT (US); Sang Uk Nam, Stamford, CT (US); Tyler Anderson, Stamford, CT (US); Marco Massaro, Stamford, CT (US)

(73) Assignee: Auraglow LLC, Stamford, CT (US)

( * ) Notice: Subject to any disclaimer, the term of this patent is extended or adjusted under 35 U.S.C. 154(b) by 0 days.

(21) Appl. No.: 18/046,044

(22) Filed: Oct. 12, 2022

(65) Prior Publication Data

US 2023/0187951 A1 Jun. 15, 2023

Related U.S. Application Data

(63) Continuation of application No. PCT/US2022/021600, filed on Mar. 23, 2022, which
(Continued)

(51) Int. Cl.
*H02J 7/00* (2006.01)
*A61C 17/22* (2006.01)
(Continued)

(52) U.S. Cl.
CPC .......... *H02J 7/0044* (2013.01); *A61C 17/224* (2013.01); *H02J 50/005* (2020.01); *H02J 50/12* (2016.02); *H02J 50/90* (2016.02)

(58) Field of Classification Search
CPC .................................................. H02J 7/0044
(Continued)

(56) References Cited

U.S. PATENT DOCUMENTS

D347,617 S 6/1994 Tattari
6,364,716 B1 * 4/2002 Seo ........................ H01R 35/04
439/174
(Continued)

FOREIGN PATENT DOCUMENTS

CN 109223229 A 1/2019
CN 305664621 3/2020
(Continued)

OTHER PUBLICATIONS

International Search Report and Written Opinion for PCT Application No. PCT/US2022/021600 mailed Jun. 24, 2022 in 12 pages.
(Continued)

*Primary Examiner* — Edward Tso
*Assistant Examiner* — Ahmed H Omar
(74) *Attorney, Agent, or Firm* — Knobbe, Martens Olson & Bear, LLP

(57) ABSTRACT

Systems and method for an electric toothbrush and charging dock. The electric toothbrush may include at least one magnetic member and at least one charging coil in a central portion. The charging dock may include at least one magnetic member and at least one transmitting coil. The charging dock may include a proximal portion which may be attached to a distal portion of the charging dock to be rotatable relative to the distal portion. The charging dock may include at least one unit capable of receiving power from a power source. The energy received by the unit from the power source may be transmitted to the transmitting coil. The energy may be transmitted from the transmitting coil to the receiving coil in the electric toothbrush via inductive or resonance charging. The energy may be transferred from the receiving coil to a battery in the electric toothbrush.

26 Claims, 11 Drawing Sheets

Related U.S. Application Data is a continuation-in-part of application No. 29/789,930, filed on Oct. 25, 2021, now Pat. No. Des. 999,533.

(51) Int. Cl.
*H02J 50/00* (2016.01)
*H02J 50/12* (2016.01)
*H02J 50/90* (2016.01)

(58) Field of Classification Search
USPC .......................................................... 320/108
See application file for complete search history.

(56) References Cited

U.S. PATENT DOCUMENTS

| | | | |
|---|---|---|---|
| 6,821,134 B2 * | 11/2004 | Chen | H01R 35/04 439/11 |
| 7,049,790 B2 | 5/2006 | Pfenniger | |
| 7,125,257 B1 * | 10/2006 | Liang | H01R 35/04 439/27 |
| D652,791 S | 1/2012 | Petrie et al. | |
| 8,686,683 B2 | 4/2014 | Caskey et al. | |
| 9,337,675 B2 | 5/2016 | Jung et al. | |
| D792,583 S | 7/2017 | Walther et al. | |
| D836,547 S | 12/2018 | Uttley | |
| D838,991 S | 1/2019 | Choi et al. | |
| 10,184,624 B2 | 1/2019 | Chein | |
| D845,636 S | 4/2019 | Porter et al. | |
| D850,112 S | 6/2019 | Wang | |
| D855,263 S | 7/2019 | Raku | |
| D864,575 S | 10/2019 | Meng | |
| 10,511,777 B2 | 12/2019 | Nichols | |
| 10,523,036 B2 | 12/2019 | Pan et al. | |
| D882,270 S | 4/2020 | Bloch et al. | |
| 10,637,263 B2 | 4/2020 | Goldberg | |
| D891,115 S | 7/2020 | Damavandi | |
| D895,296 S | 9/2020 | Hu | |
| D933,961 S | 10/2021 | He | |
| D938,733 S | 12/2021 | Wu et al. | |
| D950,247 S | 5/2022 | Johnson et al. | |
| D952,349 S | 5/2022 | McGann | |
| D955,114 S | 6/2022 | Damavandi | |
| D959,148 S | 8/2022 | Damavandi | |
| D964,746 S | 9/2022 | Gao | |
| D972,304 S | 12/2022 | Peng | |
| D998,345 S | 9/2023 | Oyler et al. | |
| D999,533 S | 9/2023 | Oyler et al. | |
| 2008/0157715 A1 | 7/2008 | Rosenboom et al. | |
| 2009/0227122 A1 * | 9/2009 | Jubelirer | H01R 31/065 439/11 |
| 2011/0227535 A1 * | 9/2011 | Caskey | H01R 35/04 320/111 |
| 2013/0176738 A1 * | 7/2013 | Tinaphong | F21V 23/0464 362/253 |
| 2015/0079809 A1 * | 3/2015 | Silva | H01R 39/64 439/13 |
| 2016/0105047 A1 * | 4/2016 | Cui | H02J 7/0044 320/115 |
| 2017/0119510 A1 | 5/2017 | Tomori et al. | |
| 2020/0179090 A1 * | 6/2020 | Copeland | H01R 33/7671 |
| 2020/0373789 A1 * | 11/2020 | Park | H02J 50/80 |
| 2023/0187951 A1 | 6/2023 | Oyler et al. | |

FOREIGN PATENT DOCUMENTS

| | | | |
|---|---|---|---|
| CN | 306251800 | 12/2020 | |
| CN | 212879656 U * | 4/2021 | .............. H02J 50/10 |
| CN | 215498341 U * | 1/2022 | |
| DE | 10033919 A1 | 2/2002 | |
| EP | 1314401 A1 * | 5/2003 | .............. A61C 17/22 |
| KR | 3011160420000 | 6/2021 | |
| WO | WO 2020/118800 | 6/2020 | |
| WO | WO 2021/174549 | 9/2021 | |
| WO | WO 2023/075827 | 5/2023 | |

OTHER PUBLICATIONS

"Mode" IPX7 waterproof toothbrush and wireless charging dock by Auraglow[on-line] dated Aug. 6, 2022.

M0de electric toothbrush, show in article entitled, "High performance meets intuitive design," [on-line]. [Published approximately 1 year ago.] [Internet retrival date Aug. 26, 2023.] URL: <https://m0de.com/products/mode-toothbrush> (Year: 2022).

M0de electric toothbrush as featured in, "Mode Electric Toothbrush Review: Features, costs, and Quality," by Simon Frers [on-line]. [Updated Jun. 8, 2023.] [Internet retrieval date Aug. 26, 2023.] URL: <https://www.dentaly.org/us/best-electric-toothbrus/mode/> (Year: 2023).

* cited by examiner

ELECTRIC TOOTHBRUSH AND CHARGING DOCK

INCORPORATION BY REFERENCE TO ANY PRIORITY APPLICATIONS

Any and all applications for which a foreign or domestic priority claim are identified in the Application Data Sheet as filed with the present application are hereby incorporated by reference under 37 CFR 1.57. This application is a continuation of PCT Application No. PCT/US2022/021600, filed Mar. 23, 2022, and titled ELECTRIC TOOTHBRUSH AND CHARGING DOCK, which claims the benefit of Design application Ser. No. 29/789,930, filed Oct. 25, 2021, and titled ELECTRIC TOOTHBRUSH AND CHARGING DOCK, the entire contents of each of these applications are incorporated by reference herein and made a part of this specification for all purposes.

BACKGROUND

Field

The present disclosure generally relates to an electric toothbrush and a charging dock, in particular, in certain embodiments to an electric toothbrush magnetically attachable to a rotatable charging dock.

Description of the Related Art

Conventional electric toothbrushes are typically charged by vertically setting a toothbrush on top of a charging base. Such a charging base is typically set on a countertop and has a long wire extending from the base to a power source. A drawback of such a charging base is that it occupies counterspace. Another drawback of a typical design of such a charging base is that the toothbrush can tip over and/or stop charging due to accidental touches. Therefore, there is a need for an improved design of an electric toothbrush and charging dock to address these and other drawbacks of existing solutions.

SUMMARY

The embodiments disclosed herein each have several aspects, of which no single one is solely responsible for the disclosure's desirable attributes. Without limiting the scope of this disclosure, the prominent features are briefly discussed herein. After considering this discussion, and particularly after reading the section entitled "Detailed Description," one will understand how the features of the embodiments described herein provide advantages over existing electric toothbrushes and charging docks.

The following disclosure describes non-limiting examples of some embodiments. For instance, other embodiments of the disclosed electric toothbrush and charging dock may or may not include the features described herein. Moreover, disclosed advantages and benefits may apply only to certain embodiments of the invention and should not be used to limit the disclosure.

Systems and method for an electric toothbrush and charging dock. An electric toothbrush and charging dock system may include an electric toothbrush and a charging dock. A central portion of the electric toothbrush may be attachable to the charging dock. The charging dock may include a portion that may be rotatable relative to another portion of the charging dock. A direction of rotation of the rotatable portion may be clockwise and/or anti-clockwise. The charging dock may receive energy from a power source. The charging dock may transmit the received energy to the detachably attached central portion of the electric toothbrush. The electric toothbrush may transfer the energy received at the central portion to a battery therein to charge the battery.

Various embodiments of the various aspects may be implemented.

In one aspect, an electric toothbrush and charging dock system may include an electric toothbrush and a charging dock.

In some embodiments, the electric toothbrush may include at least one magnetic member in a central portion thereof. In some embodiments, the electric toothbrush may include at least one charging coil in a central portion thereof. In some embodiments, the electric toothbrush may include at least one charging coil at least partially in a central portion thereof and at least partially in a handle portion thereof. In some embodiments, the electric toothbrush may include at least one charging coil in a handle portion thereof. In some embodiments, the electric toothbrush may include at least one battery.

In some embodiments, the charging dock may include a proximal portion including at least one magnetic member. In some embodiments, the charging dock may include a distal portion including at least one transmitting coil. In some embodiments, the distal portion may include a power plug. In some embodiments, the power plug may receive energy from a power source.

In some embodiments, the proximal portion of the charging dock may be attached to the distal portion of the charging dock to be rotatable relative to the distal portion. In some embodiments, a direction of rotation of the proximal portion relative to the distal portion may be clockwise. In some embodiments, a direction of rotation of the proximal portion relative to the distal portion may be anti-clockwise.

In some embodiments, the central portion of the electric toothbrush and the proximal portion of the charging dock may be magnetically attachable to each other. In some embodiments, the central portion of the electric toothbrush and the proximal portion of the charging dock may magnetically attach to each other via the at least one magnetic member in the central portion of the electric toothbrush and the at least one magnetic member in the proximal portion of the charging dock.

In some embodiments, the distal portion of the charging dock may receive energy from the power source via the power plug.

In some embodiments, the distal portion of the charging dock may transmit the received energy from the power plug to the at least one transmitting coil in the charging dock.

In some embodiments, the distal portion of the charging dock may transmit the received energy from the at least one transmitting coil in the charging dock to the at least one charging coil in the central portion of the electric toothbrush.

In some embodiments, the charging coil in the central portion of the electric toothbrush may receive energy from the at least one transmitting coil in the charging dock.

In some embodiments, the charging coil in the central portion of the electric toothbrush may transfer the received energy to the at least one battery in the electric toothbrush when the central portion of the electric toothbrush and the proximal portion of the charging dock are magnetically attached to each other.

In some embodiments, the energy transmitted from the at least one transmitting coil in the distal portion of the charging dock may be received by the at least one charging coil in the central portion of the electric toothbrush via inductive charging.

In some embodiments, the energy transmitted from the at least one transmitting coil in the distal portion of the charging dock may be received by the at least one charging coil in the central portion of the electric toothbrush via resonance charging.

In some embodiments, the electric toothbrush and charging dock system may include a light.

In some embodiments, the electric toothbrush and charging dock system may include a sensor that may turn the light on or off.

In some embodiments, the sensor may detect whether an external light is turned off.

In some embodiments, the sensor may turn the light on when the external light is turned off and when the at least one battery in the electric toothbrush is receiving energy from the at least one charging coil in the central portion of the electric toothbrush.

In some embodiments, the sensor may turn the light off when the external light is turned on.

In some embodiments, the sensor may turn the light off when the at least one battery in the electric toothbrush is fully charged.

In another aspect, the charging dock may include at least one magnetic member. In some embodiments, the charging dock may include at least one transmitting coil. In some embodiments, the charging dock may include at least one wire. In some embodiments, the at least one wire may receive energy from a power source.

In some embodiments, the central portion of the electric toothbrush and the charging dock may be magnetically attachable to each other. In some embodiments, the central portion of the electric toothbrush and the charging dock may magnetically attach to each other via the at least one magnetic member in the central portion of the electric toothbrush and the at least one magnetic member in the charging dock.

In some embodiments, the charging dock may receive energy from the power source via the at least one wire.

In some embodiments, the charging dock may transmit the received energy from the at least one wire to the at least one transmitting coil in the charging dock.

In some embodiments, the charging dock may transmit the received energy from the at least one transmitting coil in the charging dock to the at least one charging coil in the central portion of the electric toothbrush.

In some embodiments, the charging coil in the central portion of the electric toothbrush may receive energy from the at least one transmitting coil in the charging dock.

In some embodiments, the charging coil in the central portion of the electric toothbrush may transfer the received energy to the at least one battery in the electric toothbrush when the central portion of the electric toothbrush and the charging dock are magnetically attached to each other.

In some embodiments, the energy transmitted from the at least one transmitting coil in the charging dock may be received by the at least one charging coil in the central portion of the electric toothbrush via inductive charging.

In some embodiments, the energy transmitted from the at least one transmitting coil in the charging dock may be received by the at least one charging coil in the central portion of the electric toothbrush via resonance charging.

In another aspect, a method of charging at least one battery in an electric toothbrush may include magnetically attaching a central portion of the electric toothbrush to a charging dock.

In some embodiments, the central portion of the electric toothbrush may be attached to the charging dock via at least one magnetic member in the central portion of the electric toothbrush and at least one magnetic member in the charging dock.

In some embodiments, the method may include receiving energy from a power source to at least one unit in the charging dock.

In some embodiments, the at least one unit may include a power plug.

In some embodiments, the at least one unit may include at least one wire.

In some embodiments, the method may include transmitting the received energy from the at least one unit to at least one transmitting coil in the charging dock.

In some embodiments, the method may include transmitting the received energy from the at least one transmitting coil in the charging dock to at least one charging coil in the central portion of the electric toothbrush.

In some embodiments, the method may include transferring the received energy from the at least one charging coil in the central portion of the electric toothbrush to the at least one battery in the electric toothbrush.

In some embodiments, the method may include transmitting energy from the at least one transmitting coil in the charging dock to the at least one charging coil in the central portion of the electric toothbrush via inductive charging.

In some embodiments, the method may include transmitting energy from the at least one transmitting coil in the charging dock to the at least one charging coil in the central portion of the electric toothbrush via resonance charging.

In some embodiments, the method may include a sensor detecting whether an external light is turned off.

In some embodiments, the charging dock may include a light and a sensor.

In some embodiments, the sensor may turn the light on or off.

In some embodiments, the method may include the sensor turning the light on when the external light is turned off and when the at least one battery in the electric toothbrush is receiving energy from the at least one charging coil in the central portion of the electric toothbrush.

In some embodiments, the method may include the sensor turning the light off when the external light is turned on.

In some embodiments, the method may include the sensor turning the light off when the at least one battery in the electric toothbrush is fully charged.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several embodiments in accordance with the disclosure and not to be considered limiting of its scope, the disclosure will be described with additional specificity and detail through use of the accompanying drawings. In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the drawings, may be arranged, substituted, combined, and designed in a wide variety of different configurations, all of which are explicitly contemplated and made part of this disclosure.

DETAILED DESCRIPTION

The following detailed description is directed to certain specific embodiments of electric toothbrush and charging dock systems and method. In this description, reference is made to the drawings wherein like parts or steps may be designated with like numerals throughout for clarity. Reference in this specification to "one embodiment," "an embodiment," or "in some embodiments" means that a particular feature, structure, or characteristic described in connection with the embodiment is included in at least one embodiment of the invention. The appearances of the phrases "one embodiment," "an embodiment," or "in some embodiments" in various places in the specification are not necessarily all referring to the same embodiment, nor are separate or alternative embodiments necessarily mutually exclusive of other embodiments. Moreover, various features are described which may be exhibited by some embodiments and not by others. Similarly, various requirements are described which may be requirements for some embodiments but may not be requirements for other embodiments. The embodiments of the invention, examples of which are illustrated in the accompanying drawings, are set forth in detail below. Wherever possible, the same reference numbers are used throughout the drawings to refer to the same or like parts.

Described herein are systems and method for an electric toothbrush and charging dock. An electric toothbrush and charging dock system may include an electric toothbrush and a charging dock. A central portion of the electric toothbrush may be attachable to the charging dock. The charging dock may include a portion that may be rotatable relative to another portion of the charging dock. A direction of rotation of the rotatable portion may be clockwise and/or anti-clockwise. The charging dock may receive energy from a power source. The charging dock may transmit the received energy to the detachably attached central portion of the electric toothbrush. The electric toothbrush may transfer the energy received at the central portion to a battery therein to charge the battery.

Figures 1A, 1B:
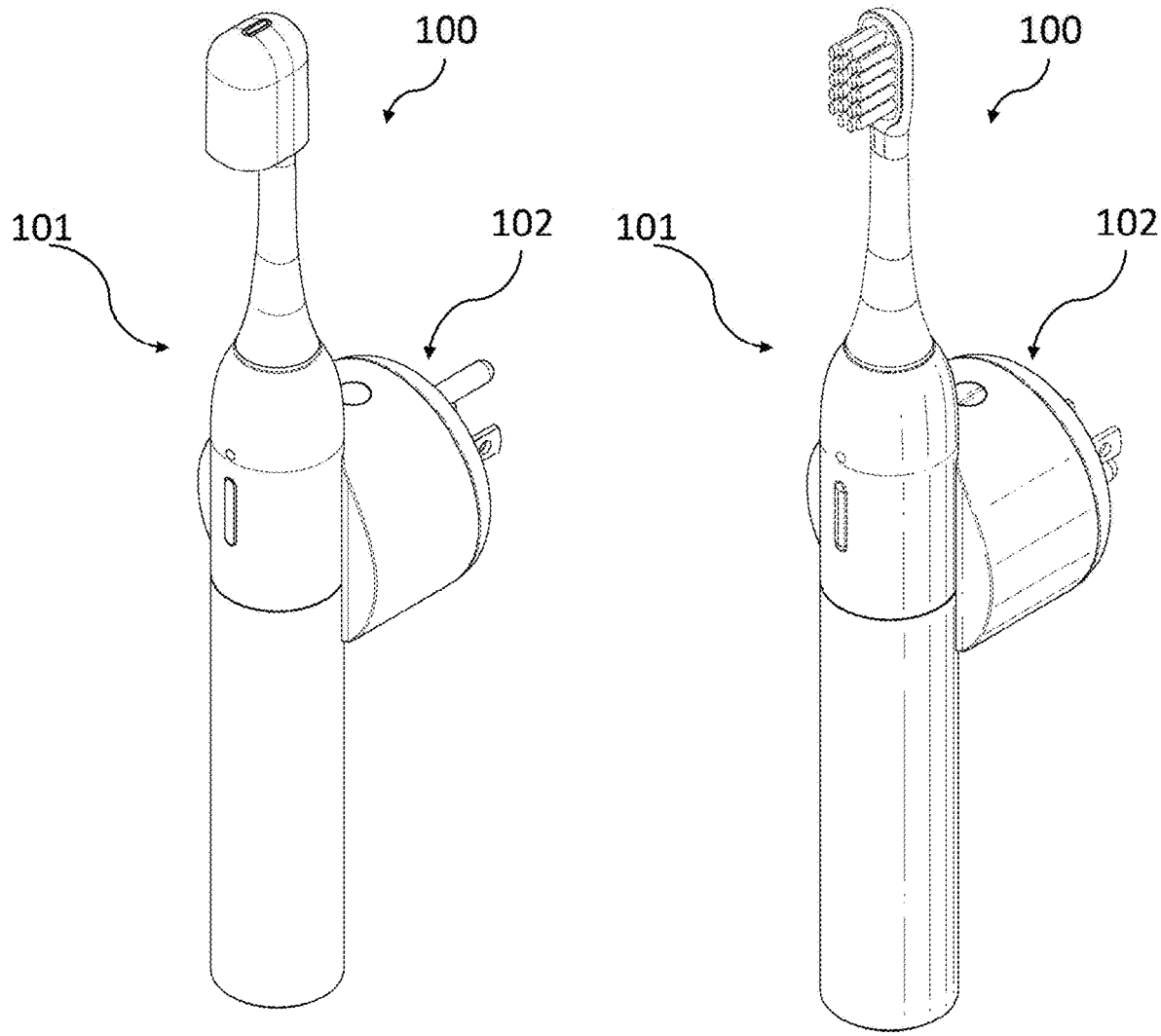
FIG. 1A is a perspective view of an embodiment of an electric toothbrush and charging dock system with a removable brush head cover shown.
FIG. 1B is a perspective view of an embodiment of an electric toothbrush and charging dock system without a removable brush head cover shown.
Figure 2:
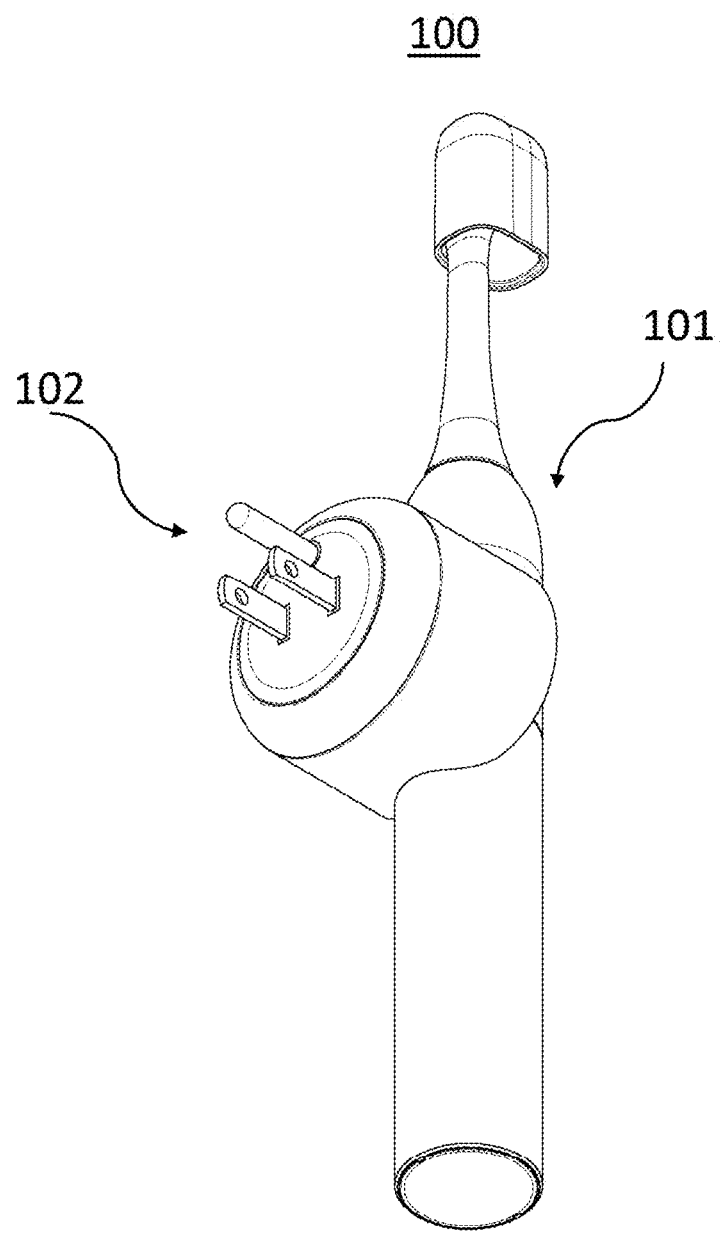
FIG. 2 is a different perspective view of the embodiment of FIG. 1A.

FIG. 1A is a perspective view of an embodiment of an electric toothbrush and charging dock system 100 with a removable brush head cover 160 shown. FIG. 1B is a perspective view of an embodiment of an electric toothbrush and charging dock system 100 without the removable brush head cover 160 shown. FIG. 2 is a different perspective view of the embodiment of FIG. 1A. The electric toothbrush and charging dock system 100 may include an electric toothbrush 101 and a charging dock 102. An "electric toothbrush," as used herein, has its usual and customary meaning and includes without limitation of a toothbrush that makes rapid automatic bristle motions at sonic or ultrasonic speeds, either back-and-forth oscillation or rotation-oscillation, in order to clean teeth. The electric toothbrush may be powered by at least one battery therein.

Figure 3:
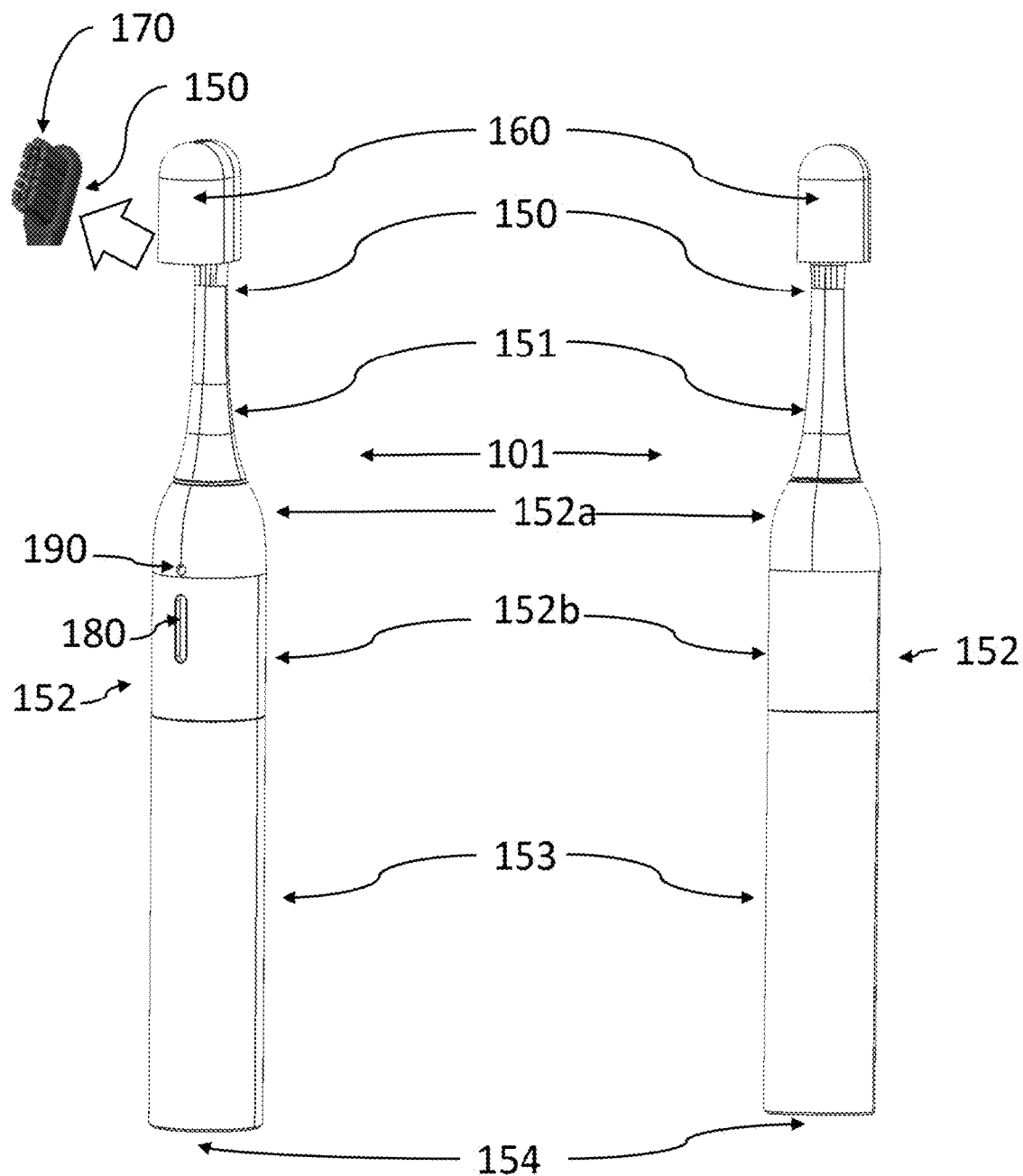
FIGS. 3A and 3B are perspective views of an electric toothbrush of the embodiment of FIG. 1A shown in isolation from the charging dock.

FIGS. 3A and 3B are perspective views of an electric toothbrush 101 of the embodiment of FIG. 1A shown in isolation from the charging dock. The electric toothbrush 101 may include at least one brush head 150. In some embodiments, the brush head 150 may be detachable from the rest of the electric toothbrush 101. The brush head 150 may include bristles 170 arranged thereon in different shapes, sizes and/or patterns, including, but not limited to, circular, rectangular, triangular and square, or a combination thereof. The bristles 170 on the brush head 150 may be made of different materials, including, but not limited to, plastic, nylon, bamboo, and hair, or a combination thereof. In some embodiments, the brush head 150 may include the removable brush head cover 160. In some embodiments, the brush head cover 160 may enclose the brush head 150 to prevent the brush head 150 and the bristles 170 thereon being continuously exposed to moisture, bacteria and/or viruses. The brush head cover 160 may be made of different materials, including but not limited to, metal, rubber, plastic, and bamboo, or a combination thereof.

The brush head 150 may be attached to a neck portion 151 of the electric toothbrush 101. The neck portion 151 may have different shapes and/or sizes, including, but not limited to, conical, pyramidal, triangular, and trapezoidal, or a combination thereof. The neck portion 151 of the electric toothbrush 101 may be made of different materials, including, but not limited to, metal, plastic, and rubber, or a combination thereof. In some embodiments, the neck portion 151 may be detachable from the brush head 150. In some embodiments, the neck portion may be detachable from the rest of the electric toothbrush 101.

The neck portion 151 may be attached to a central portion 152 of the electric toothbrush 101. The central portion 152 of the electric toothbrush 101 may include an overall length in a range of 20% to 80% of an overall length of the electric toothbrush 101 and be centered about the longitudinal center of the electronic toothbrush as measured from the tip of the brush to the base of the brush. In some embodiments, the central portion 152 of the electric toothbrush may include a power button 180. The power button 180 may turn the electric toothbrush 101 on or off. The power button 180 may be made of different materials, including, but not limited to, metal, plastic, and rubber, or a combination thereof.

In some embodiments, the central portion 152 of the electric toothbrush may include an indicator light 190. In some embodiments, the indicator light 190 may turn on when the electric toothbrush 101 is turned on. In some embodiments, the indicator light 190 may turn on when the electric toothbrush is being charged. In some embodiments, the indicator light 190 may be turned off when the electric toothbrush 101 is turned off. In some embodiments, the indicator light 190 may flash to indicate that the at least one battery of the electric toothbrush 101 needs to be charged. In some embodiments, the indicator light 190 may be an LED light.

The central portion 152 of the electric toothbrush 101 may include a top portion 152a and a bottom portion 152b. The top portion 152a may include an overall length in a range of 5% to 40% of an overall length of the electric toothbrush 101 and can extend from the tip of the brush. The bottom portion 152b may include an overall length in a range of 5% to 40% of an overall length of the central portion 152 of the electric toothbrush 101 and can extend from the base of the brush.

The top portion 152a of the central portion 152 may have different shapes and/or sizes, including, but not limited to, conical, pyramidal, triangular, and trapezoidal, or a combination thereof. The top portion 152a of the central portion 152 may be made of different materials, including, but not limited to, magnetically attractive material, metal, plastic, and rubber, or a combination thereof. In some embodiments, the top portion 152a of the central portion 152 may include an overmold. The overmold may be made of different materials, including, but not limited to, magnetically attractive material, metal, plastic, and rubber, or a combination thereof. In some embodiments, the top portion 152a of the central portion 152 may include the indicator light 190.

The bottom portion 152b of the central portion 152 may have different shapes and/or sizes, including, but not limited to, cylindrical, cuboid, and rectangular, or a combination thereof. The bottom portion 152b of the central portion 152 may be made of different materials, including, but not limited to, magnetically attractive material, metal, plastic, and rubber, or a combination thereof. In some embodiments, the bottom portion 152b of the central portion 152 may include an overmold. The overmold may be made of different materials, including, but not limited to, magnetically attractive material, metal, plastic, and rubber, or a combination thereof. In some embodiments, the bottom portion 152b of the central portion 152 may include the indicator light 190. In some embodiments, the bottom portion 152b of the central portion 152 may include the power button 180.

The central portion 152 may be attached to a handle portion 153 of the electric toothbrush 101. The handle portion 153 of the electric toothbrush 101 may have different shapes and/or sizes, including, but not limited to, cylindrical, cuboid, and rectangular, or a combination thereof. The handle portion 153 of the electric toothbrush 101 may be made of different materials, including, but not limited to, magnetically attractive material, metal, plastic, and rubber, or a combination thereof.

The central portion 152 of the electric toothbrush 101 may include at least one magnetic member 130 (shown in FIG. 4) on an inner side thereof. In some embodiments, the at least one magnetic member 130 may be a permanent magnet. In some embodiments, the at least one magnetic member 130 may be an electromagnet. In some embodiments, the at least one magnetic member 130 may be a material that is attracted to a magnet.

In some embodiments, the electric toothbrush 101 may also include at least one charging coil 181 (shown in FIG. 4) on an inner side thereof in the central portion 152. In some embodiments, the electric toothbrush 101 may include the at least one charging coil 181 at least partially in the central portion 152 and at least partially in the handle portion 153. In some embodiments, the electric toothbrush 101 may include the at least one charging coil 181 in the handle portion 153. The charging coil 181 may be made of different materials, including, but not limited to, copper, silver, and aluminum, or a combination thereof. As shown in the illustrated embodiment, the charging coil 181 may be positioned longitudinally along the length of the electric toothbrush 101 between the pair of magnetic members 130.

The charging coil 181 may receive energy. In some embodiments, the charging coil 181 may receive energy by inductive charging. In some embodiments, the charging coil 181 may receive energy by resonance charging. In some embodiments, the charging coil may receive energy from at least one transmitting coil 182 (shown in FIG. 7). In some embodiments, the transmitting coil 182 may be included in the charging dock 102. The charging coil 181 may transfer received energy to the at least one battery 157 in the electric toothbrush 101 to charge the at least one battery 157.

The handle portion 153 of the electric toothbrush 101 may include a base 154. In some embodiments, the electric toothbrush 101 may be able to stand vertically on the base 154. The base 154 of the handle portion 153 of the electric toothbrush 101 may have different shapes and/or sizes, including, but not limited to, circular, triangular, square, and rectangular, or a combination thereof.

The handle portion 153 of the electric toothbrush 101 may include at least one space 156 to insert at least one battery 157 therein. In some embodiments, the at least one battery (not shown) may be a rechargeable battery.

In some embodiments, the electric toothbrush 101 may include at least one printed circuit board (PCB) 183. In some embodiments, the PCB 183 may control motions and/or speed of the bristles 170. In some embodiments, the PCB may control transfer of energy from a power source to a motor controlling the motions and/or speed of the bristles 170. In some embodiments, the PCB 183 may at least partially be located in the handle portion 153 of the electric toothbrush 101. In some embodiments, the PCB 183 may at least partially be located in the central portion 152 of the electric toothbrush 101.

Figure 4:
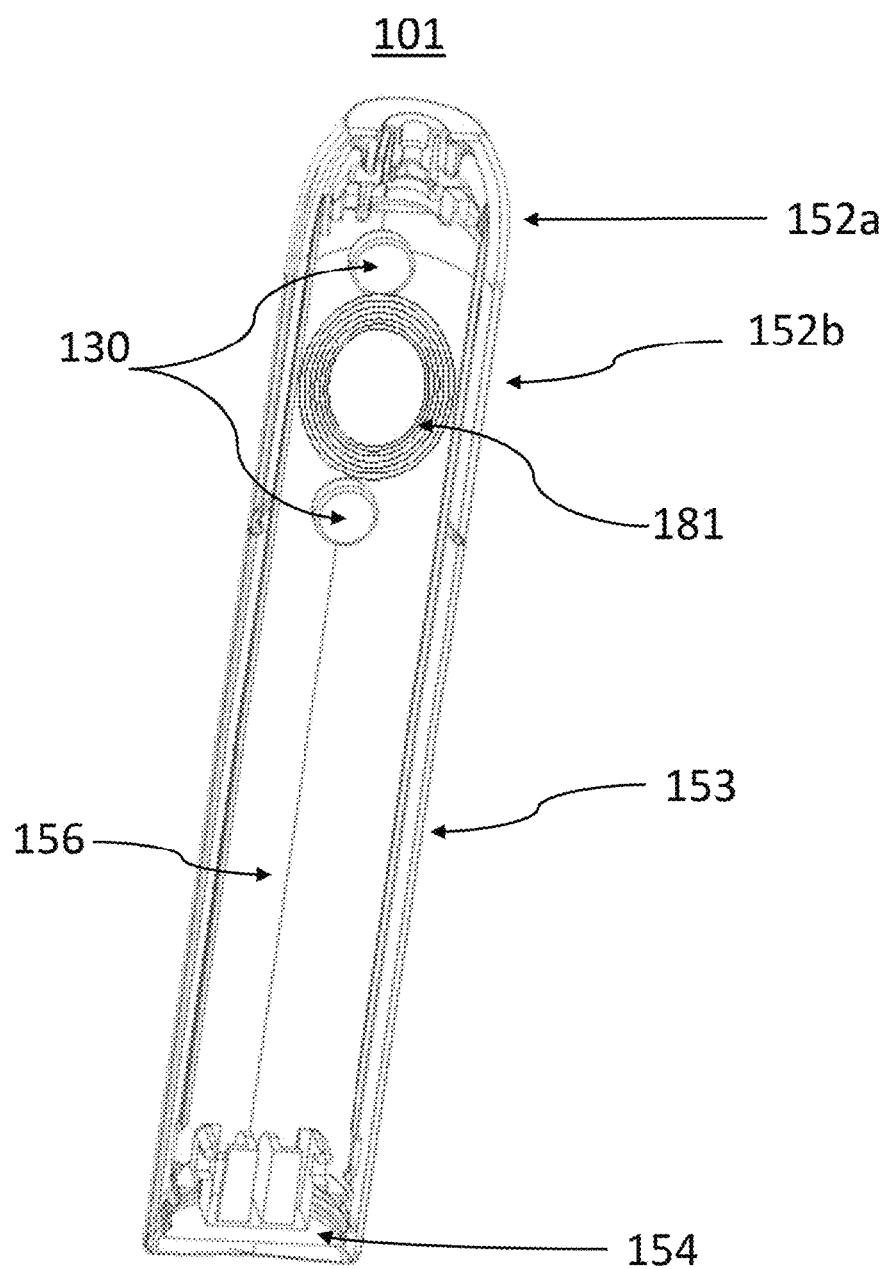
FIG. 4 is a cross-sectional perspective view of a central portion and a handle portion of the electric toothbrush of the embodiments of FIGS. 3A and 3B.

FIG. 4 is a cross-sectional perspective view of the central portion 152 and the handle portion 153 of the electric toothbrush 101 of the embodiments of FIGS. 3A and 3B. FIG. 4 shows an embodiment of the at least one magnetic member 130 and the at least one charging coil 181 located in the central portion 152 of the electric toothbrush 101. FIG. 4 shows an embodiment, for example, with two magnetic members 130. FIG. 4 also shows an embodiment, for example, of the at least one charging coil 181 adjacent to and between two magnetic members 130 located in the central portion 152 of the electric toothbrush 101. In some embodiments, the at least one charging coil 181 may be located adjacent to and around the at least one magnetic member 130 located in the central portion 152 of the electric toothbrush 101.

Figure 5:
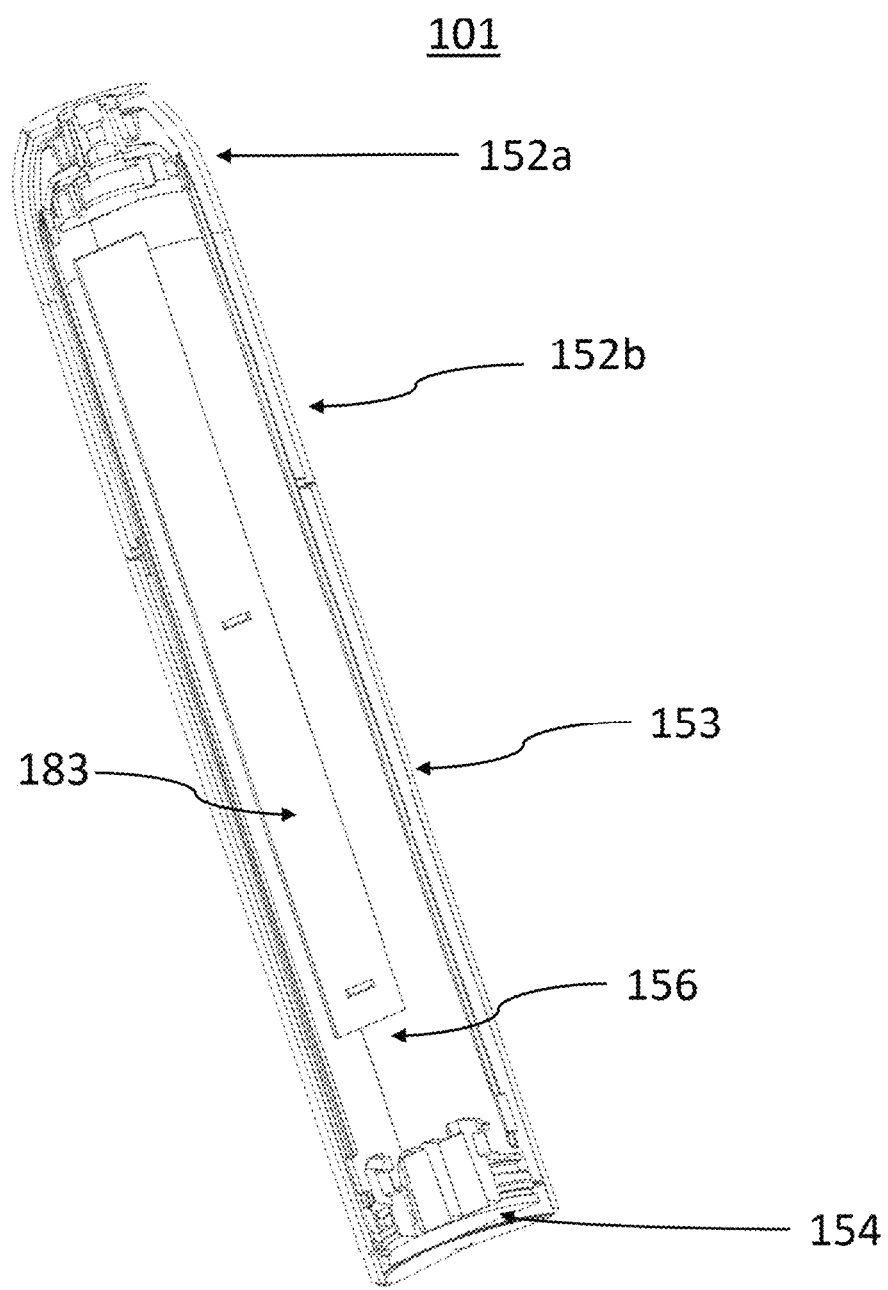
FIG. 5 is a different cross-sectional perspective view of a central portion and a handle portion of the electric toothbrush of the embodiments of FIGS. 3A and 3B.

FIG. 5 is an opposite side cross-sectional perspective view of the central portion 152 and the handle portion 153 of the electric toothbrush 101 of the embodiments of FIGS. 3A and 3B. FIG. 5 shows an embodiment, for example, of the at least one PCB 183 located partially in the central portion 152 of the electric toothbrush and located partially in the handle portion 153 of the electric toothbrush 101.

Figures 6A, 6B:
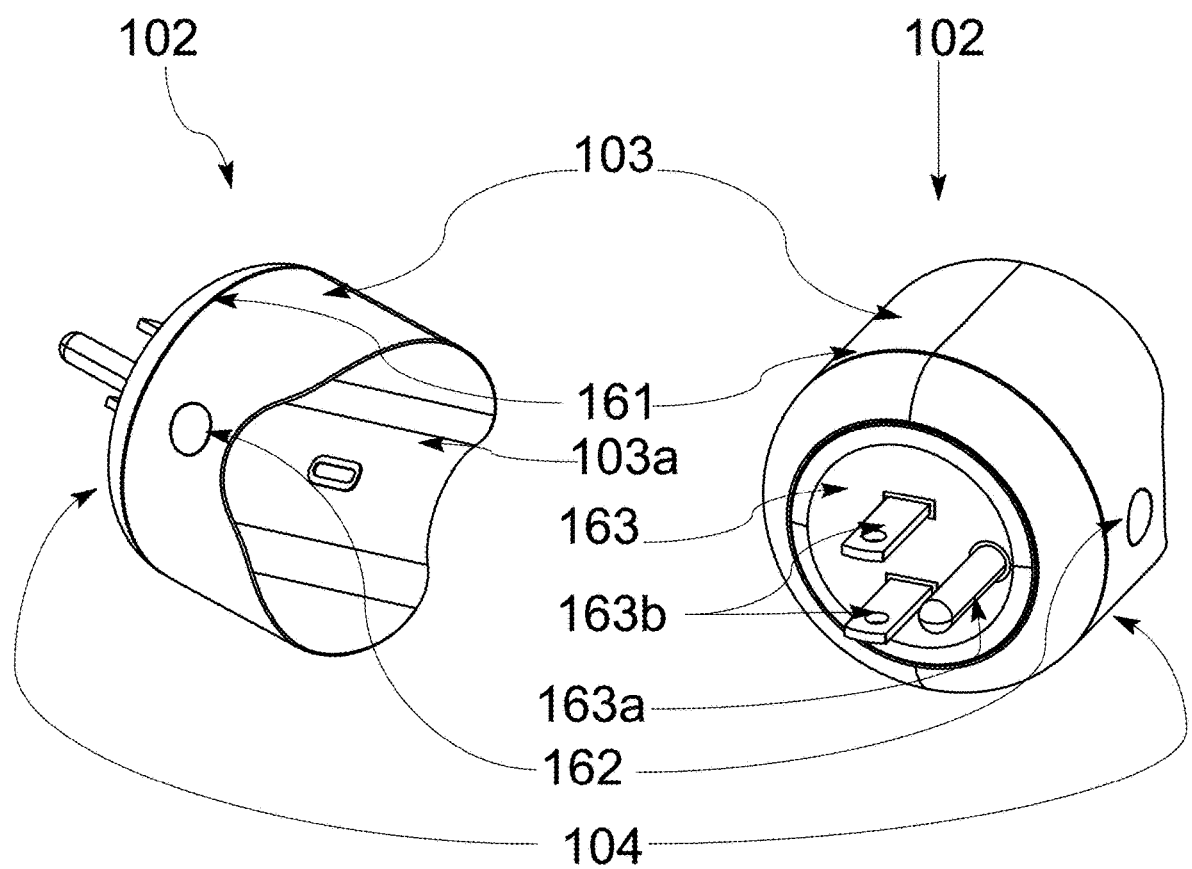
FIGS. 6A and 6B are perspective views of a charging dock of the embodiment of FIGS. 1A and 1B shown in isolation from the electric toothbrush.
Figure 7:
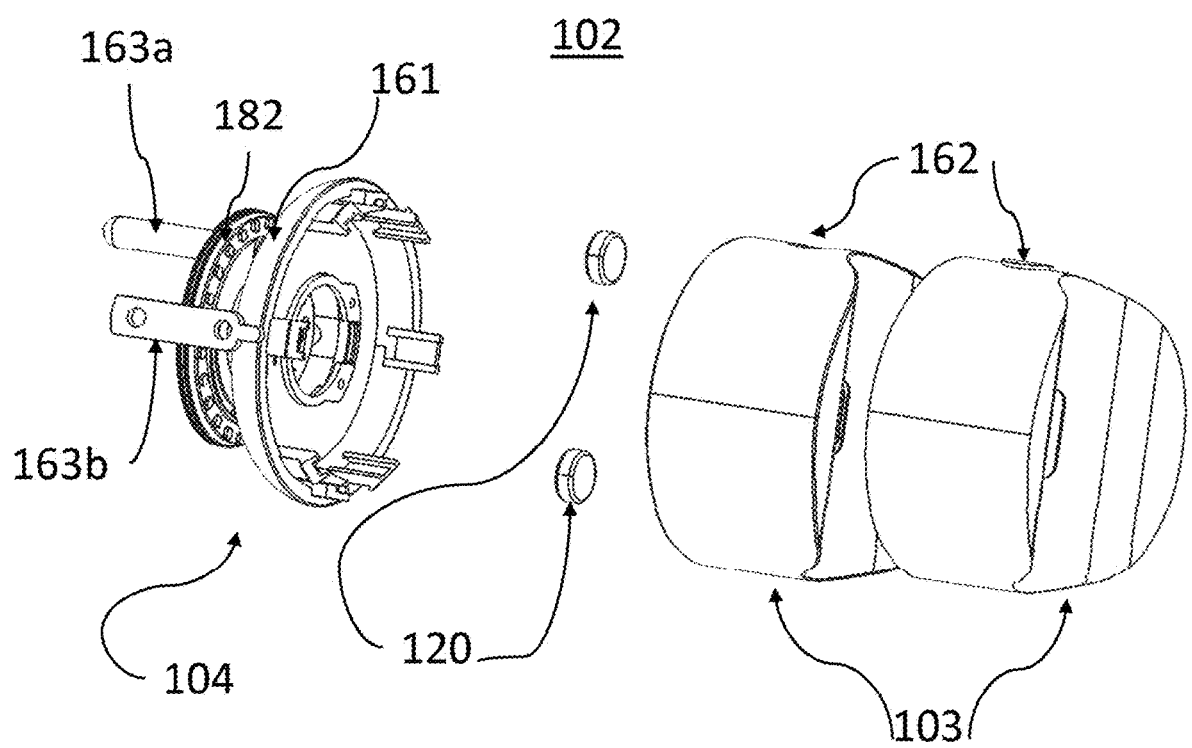
FIG. 7 is an exploded perspective view of the charging dock of FIGS. 6A and 6B.

FIGS. 6A and 6B are perspective views of a charging dock 102 of the embodiment of FIG. 1A shown in isolation from the electric toothbrush 101. FIG. 7 is an exploded perspective view of the charging dock of FIGS. 6A and 6B.

The charging dock 102 may be made of different materials, including, but not limited to, magnetically attractive material, metal, plastic, and rubber, or a combination thereof. The charging dock 102 may include a proximal portion 103 and a distal portion 104.

The proximal portion 103 may be rotatable relative to the distal portion 104 of the charging dock 102. In some embodiments, the proximal portion 103 may be rotatable relative to the distal portion 104 of the charging dock in a clockwise direction. In some embodiments, the proximal portion 103 may be rotatable relative to the distal portion 104 of the charging dock in an anti-clockwise direction.

In some embodiments, the proximal portion 103 may be rotatable relative to the distal portion 104 of the charging dock 102 along an X-Y axis parallel to the distal portion 104. In some embodiments, an angle of rotation of the proximal portion 103 relative to the distal portion 104 of the charging dock along an X-Y axis parallel to the distal portion 104 of the charging dock 102 may include a range of angles of rotation from 0 degrees to 90 degrees (shown, for example, in FIGS. 8A and 8B). In some embodiments, an angle of rotation of the proximal portion 103 relative to the distal portion 104 of the charging dock along an X-Y axis parallel to the distal portion 104 of the charging dock 102 may include a range of angles of rotation from 0 degrees to 180 degrees. In some embodiments, an angle of rotation of the proximal portion 103 relative to the distal portion 104 of the charging dock along an X-Y axis parallel to the distal portion 104 of the charging dock 102 may include a range of angles of rotation from 0 degrees to 270 degrees. In some embodiments, an angle of rotation of the proximal portion 103 relative to the distal portion 104 of the charging dock along an X-Y axis parallel to the distal portion 104 of the charging dock 102 may include a range of angles of rotation from 0 degrees to 360 degrees.

In some embodiments, the proximal portion 103 may be rotatable relative to the distal portion 104 of the charging dock 102 along at least one X-Y axis at an angle to the distal portion 104 of the charging dock 102. In some embodiments, an angle of the at least one X-Y axis of rotation of the proximal portion 103 relative to the distal portion 104 of the charging dock 102 may include a range of angles of rotation from 0 degrees to 20 degrees.

A side 103a (shown in FIG. 6A) of the proximal portion 103 of the charging dock 102 may be shaped so that a portion of the electric toothbrush 101 may snugly fit into the proximal portion 103 of the charging dock 102. In some embodiments, the side 103a may be shaped to form a valley in a direction of the distal portion 104 of the charging dock 102. In some embodiments, at least a part of the side 103a of the proximal portion 103 may be semicircular. In some embodiments, a radius of the semicircular part of the side 103a of the proximal portion 103 may be similar to a radius of a cylindrical-shaped central portion 152 of the electric toothbrush 101. In some embodiments, at least a part of the central portion 152 of the electric toothbrush 101 may at least partially fit into at least a part of the side 103a of the proximal portion 103 of the charging dock 102. In some embodiments, at least a part of the handle portion 153 of the electric toothbrush 101 may at least partially fit into at least a part of the side 103a of the proximal portion 103 of the charging dock 102. FIGS. 1 and 2 show an embodiment, for example, where at least a part of the central portion 152 and at least a part of the handle portion 153 of the electric toothbrush 101 at least partially fit into at least a part of the side 103a of the proximal portion 103 of the charging dock 102.

The proximal portion 103 of the charging dock 102 may include at least one magnetic member 120 on an inner side thereof. FIG. 7 shows an embodiment, for example, with two magnetic members 120. In some embodiments, the at least one magnetic member 120 may be a permanent magnet. In some embodiments, the at least one magnetic member 120 may be an electromagnet.

In some embodiments, the central portion 152 of the electric toothbrush 101 may be removably attached to the proximal portion 103 of the charging dock 102. In some embodiments, the central portion 152 of the electric toothbrush 101 may be removably attached to the proximal portion 103 of the charging dock 102 by magnetic attraction between the at least one magnetic member 130 on an inner side of the central portion 152 of the electric toothbrush 101 and the at least one magnetic member 120 on an inner side of the proximal portion 103 of the charging dock 102.

In some embodiments, the handle portion 153 of the electric toothbrush 101 may be removably attached to the proximal portion 103 of the charging dock 102. In some embodiments, the handle portion 153 of the electric toothbrush 101 may be removably attached to the proximal portion 103 of the charging dock 102 by magnetic attraction between a metallic part of the handle portion 153 of the electric toothbrush 101 and the at least one magnetic member 120 on an inner side of the proximal portion 103 of the charging dock 102.

The distal portion 104 of the charging dock 102 may include a power plug 163. The power plug 163 may receive energy from a power source. In some embodiments, the power source may be a power outlet. In some embodiments, the power outlet may be wall mounted. In some embodiments, the power outlet may be a part of a power strip. In some embodiments, the power outlet may be located immediately adjacent to an other power outlet. In some embodiments, pins 163a and ground pin 163b of the power plug 163 may be directly insertable into a power outlet.

In some embodiments, a ground pin 163a may not be configured to receive and/or transmit energy. In some embodiments, the ground pin 163a may support the charging dock 102 when inserted into a power outlet to prevent accidental removal of the charging dock 102 from the power outlet. In some embodiments, the ground pin 163a may be configured to receive and/or transmit energy.

The pins 163b of the power plug 163 may receive energy from a power source. In some embodiments, the pins 163b and the ground pin 163a may be shaped to and may be capable of receiving energy from an American-style power outlet. In some embodiments, the pins 163b and the ground pin 163a may be shaped to and may be capable of receiving energy from another-style power outlet including, but not limited to, European-style, Asian-style, Australian-style, and Great Britain-style.

Figure 8A:
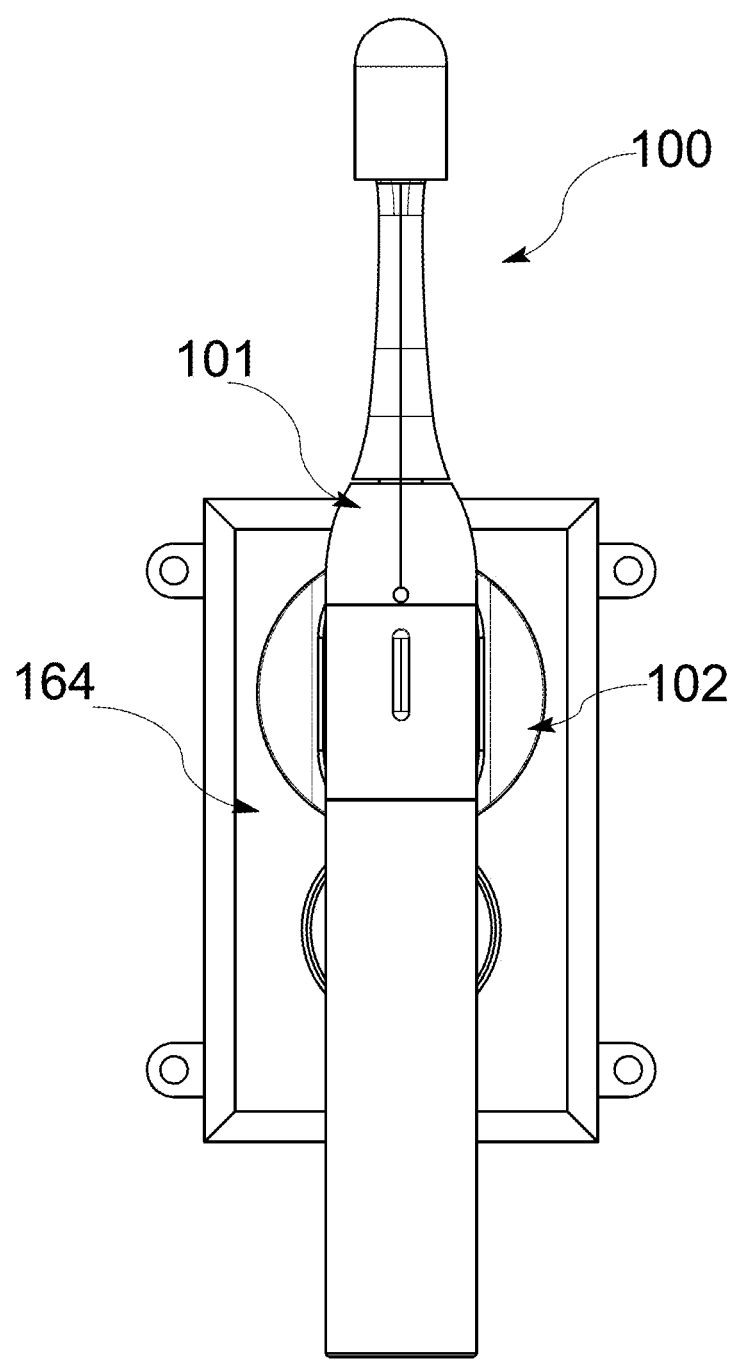
FIGS. 8A and 8B are frontal views of the embodiment of FIG. 1A shown connected to a power source and showing the electric toothbrush in rotationally different positions relative to the charging dock.
Figure 8B:
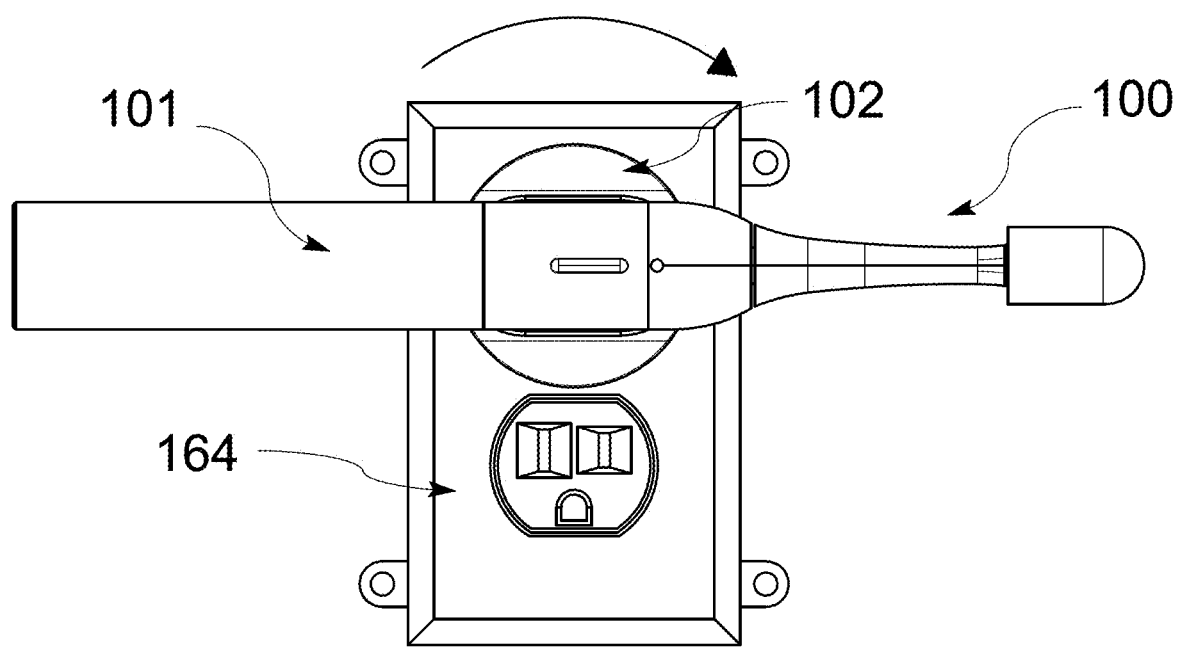

FIGS. 8A and 8B show frontal views of the electric toothbrush and charging dock system 100 inserted into a power source. FIGS. 8A and 8B show, for example, where the power source is an American-style wall mounted power outlet 164. FIG. 8A also shows, for example, a frontal view of the electric toothbrush 101 where the central portion 152 thereof is attached to the charging dock 102 and the charging dock 102 is inserted into the power outlet 164 via the power plug 163 (not shown).

FIG. 8A shows, for example, an embodiment where the angle of rotation of the proximal portion 103 of the charging dock 102 relative to the distal portion 104 of the charging dock 102 along an X-Y axis parallel to the distal portion 104 of the charging dock 102 may be 0 degrees or 90 degrees. In this embodiment, for example, a length of the electric toothbrush 101 may be substantially parallel to a length of the power outlet 164.

FIG. 8B shows, for example, an embodiment where the angle of rotation of the proximal portion 103 of the charging dock 102 relative to the distal portion 104 of the charging dock 102 along an X-Y axis parallel to the distal portion 104 of the charging dock 102 may be 90 degrees or 270 degrees. In this embodiment, for example, the length of the electric toothbrush 101 may be substantially perpendicular to the length of the power outlet 164.

The charging dock 102 may include at least one transmitting coil 182. In some embodiments, the at least one transmitting coil 182 may be located in the distal portion 104 of the charging dock 102. In some embodiments, the at least one transmitting coil 182 may be located in the proximal portion 103 of the charging dock 102. The at least one transmitting coil 182 may be made of different materials, including, but not limited to, copper, silver, and aluminum, or a combination thereof.

The at least one transmitting coil 182 may receive energy from a power source. In some embodiments, the at least one transmitting coil 182 may receive energy from a power source via the power plug 163. The at least one transmitting coil 182 may transmit energy. In some embodiments, the at least one transmitting coil 182 may transmit energy by inductive charging. In some embodiments, the at least one transmitting coil 182 may transmit energy by resonance charging. In some embodiments, the at least one transmitting coil 182 may transmit energy to the at least one charging coil 181 in the central portion 153 of the electric toothbrush 101.

A method of charging the at least one battery 157 in the electric toothbrush 101 via the charging dock 102 may include the central portion 152 of the electric toothbrush magnetically attaching to the proximal portion 103 of the charging dock 102 via the at least one magnetic member 130 in the central portion 152 of the electric toothbrush 101 and the at least one magnetic member 120 in the proximal portion 103 of the charging dock 102. The method of charging may include the power plug 163 receiving energy from a power source. The method of charging may include transmitting the received energy from the power plug 163 to the at least one transmitting coil 182 in the charging dock 102. The method of charging may include transmitting the received energy from the at least one transmitting coil 182 in the charging dock 102 to the at least one charging coil 181 in the central portion 152 of the electric toothbrush 101. The method of charging may include transferring the received energy from the at least one charging coil 181 in the central portion 152 of the electric toothbrush 101 to the at least one battery 157 in the electric toothbrush 101.

A method of charging the at least one battery 157 in the electric toothbrush 101 via the charging dock 102 may include a metallic part of the handle portion 153 of the electric toothbrush magnetically attaching to the proximal portion 103 of the charging dock 102 via the at least one magnetic member 120 in the proximal portion 103 of the charging dock 102. The method of charging may include the power plug 163 receiving energy from a power source. The method of charging may include transmitting the received energy from the power plug 163 to the at least one transmitting coil 182 in the charging dock 102. The method of charging may include transmitting the received energy from the at least one transmitting coil 182 in the charging dock 102 to the at least one charging coil 181 in the central portion 152 of the electric toothbrush 101. The method of charging may include transferring the received energy from the at least one charging coil 181 in the central portion 152 of the electric toothbrush 101 to the at least one battery 157 in the electric toothbrush 101.

The charging dock 102 may include at least one light 161. In some embodiments, the at least one light 161 may be located in the distal portion 104 of the charging dock 102. In some embodiments, the at least one light 161 may be located in the proximal portion 103 of the charging dock 102. In some embodiments, the at least one light 161 may be an LED light. In some embodiments, the at least one light 161 may be a ring light. FIGS. 6A and 6B show an embodiment wherein, for example, the at least one light 161 is a ring light.

The charging dock 102 may include at least one sensor 162. In some embodiments, the at least one sensor 162 may be located in the distal portion 104 of the charging dock 102. In some embodiments, the at least one sensor 162 may be located in the proximal portion 103 of the charging dock 102. FIGS. 6A and 6B show an embodiment wherein, for example, the at least one sensor 162 is located in the proximal portion 103 of the charging dock 102.

The at least one sensor 162 may detect whether an external light is turned on or off. The at least one sensor 162 may turn on or off the at least one light 161 in the charging dock 102. In some embodiments, the at least one sensor 162 may turn on the at least one light 161 in the charging dock 102 if an external light is turned off. In some embodiments, the at least one sensor 162 may turn off the at least one light 161 in the charging dock 102 if an external light is turned on.

In some embodiments, the at least one sensor 162 may detect whether the charging dock 102 is placed in a surrounding with insufficient light. In some embodiments, the at least one sensor 162 may turn on the at least one light 161 in the charging dock 102 if the charging dock is placed in a surrounding with insufficient light. In some embodiments, the at least one sensor 162 may turn off the at least one light 161 in the charging dock 102 if the surrounding wherein the charging dock 102 is placed has sufficient light.

In some embodiments, the at least one sensor 162 may turn on the at least one light 161 in the charging dock 102 if an external light is turned off and if the at least one battery 157 in the electric toothbrush 101 is receiving energy from the at least one charging coil 181 in the central portion 152 of the electric toothbrush 101. In some embodiments, the at least one sensor 162 may turn off the at least one light 161 in the charging dock 102 if the at least one battery 157 in the electric toothbrush 101 is fully charged.

The electric toothbrush and charging dock system 100, wherein the charging dock 102 may include the power plug 163 may avoid the disadvantage of conventional charging docks occupying counterspace. The inclusion of a power plug 163 directly into a charging dock 102 may furthermore avoid the disadvantage of usage of wires commonly used in conventional charging docks. The electric toothbrush and charging dock system 100, wherein the power plug 163 of the charging dock 102 may be directly insertable into a power outlet and wherein the electric toothbrush 102 may directly magnetically attach to the charging dock 102 may provide advantages of being wireless and/or not occupying any counterspace (shown, for example, in FIG. 8A). The electric toothbrush and charging dock system 100 may also offer an advantage of being compact.

In some embodiments, wherein the power outlet may be located immediately adjacent to an other power outlet, the electric toothbrush and charging dock system 100 may be advantageous in not blocking access to the other power outlet. The electric toothbrush and charging dock system 100, wherein the electric toothbrush 101 is magnetically attached to the charging dock 102 and wherein the proximal portion 103 of the charging dock 102 may be rotatable relative to the distal portion 104 of the charging dock 102 along an X-Y axis parallel to the distal portion 104, may allow the electric toothbrush 101 to be rotated at an angle that may prevent the toothbrush from blocking access to the other power outlet. In some embodiments, the angle of rotation may be 90 degrees. The rotatable electric toothbrush and charging dock system 100 may, thus, allow usage of the other power outlet simultaneously by not blocking access to the other power outlet when the electric toothbrush and charging dock system 100 is inserted into an adjacent power outlet (shown, for example, in FIG. 8B).

Figure 9:
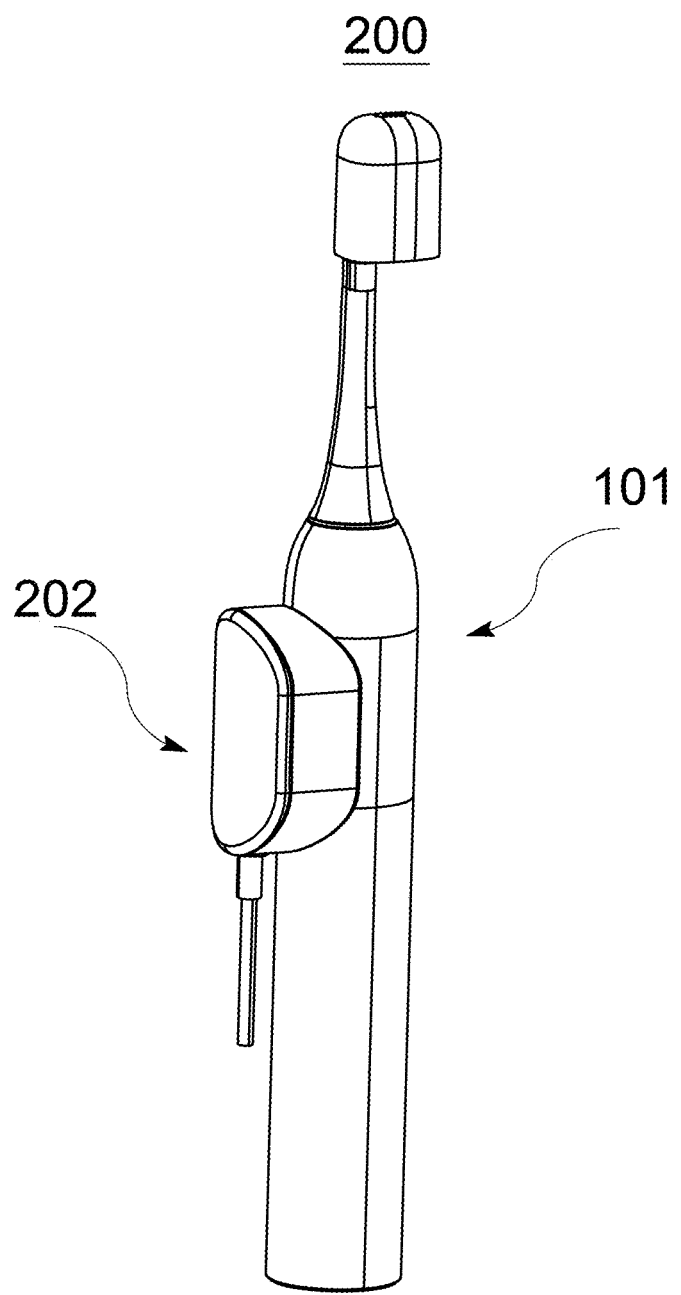
FIG. 9 is a perspective view of another embodiment of an electric toothbrush and charging dock system with a removable brush head cover shown.
Figures 10A, 10B:
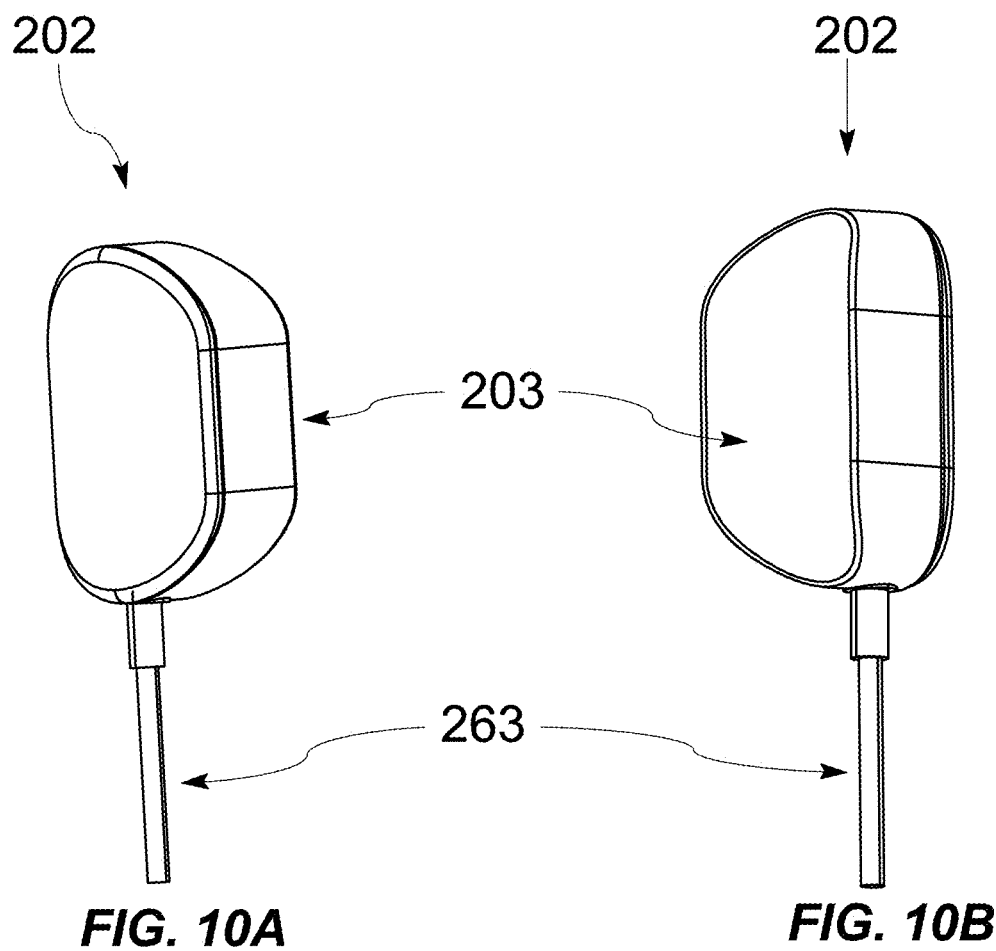
FIGS. 10A and 10B are perspective views of a charging dock of the embodiment of FIG. 9 shown in isolation from the electric toothbrush.

In another aspect, an electric toothbrush and charging dock system 200 may include an electric toothbrush 101 and a charging dock 202. FIG. 9 is a perspective view of another embodiment of an electric toothbrush and charging dock system 200. FIGS. 10A and 10B are perspective views of a charging dock 202 of the embodiment of FIG. 9 shown in isolation from the electric toothbrush 101.

The charging dock 202 may be made of different materials, including, but not limited to, magnetically attractive material, metal, plastic, and rubber, or a combination thereof. A side 203 of the charging dock 202 may be shaped so that a portion of the electric toothbrush 101 may snugly fit into the side 203 of the charging dock 202. In some embodiments, at least a part of the central portion 152 of the electric toothbrush 101 may at least partially fit into the side 203 of the charging dock 202. In some embodiments, at least a part of the handle portion 153 of the electric toothbrush 101 may at least partially fit into the side 203 of the charging dock 202. FIG. 9 shows an embodiment, for example, where at least a part of the central portion 152 and at least a part of the handle portion 153 of the electric toothbrush 101 at least partially fit into the side 203 of the charging dock 202.

The side 203 of the charging dock 202 may include at least one magnetic member 220 on an inner side thereof. In some embodiments, the at least one magnetic member 220 may be a permanent magnet. In some embodiments, the at least one magnetic member 220 may be an electromagnet.

In some embodiments, the central portion 152 of the electric toothbrush 101 may be removably attached to the side 203 of the charging dock 202. In some embodiments, the central portion 152 of the electric toothbrush 101 may be removably attached to the side 203 of the charging dock 102 by magnetic attraction between the at least one magnetic member 130 on an inner side of the central portion 152 of the electric toothbrush 101 and the at least one magnetic member 220 on an inner side of the side 203 of the charging dock 202.

In some embodiments, the handle portion 153 of the electric toothbrush 101 may be removably attached to the side 203 of the charging dock 202. In some embodiments, the handle portion 153 of the electric toothbrush 101 may be removably attached to the side 203 of the charging dock 202 by magnetic attraction between a metallic part of the handle portion 153 of the electric toothbrush 101 and the at least one magnetic member 220 on an inner side of the side 203 of the charging dock 202.

The charging dock 202 may include at least one wire 263. The at least one wire 263 may receive energy from a power source. In some embodiments, an end of the at least one wire 263 may have a power plug connected thereto. In some embodiments, an end of the at least one wire 263 may have a USB port attached thereto.

In some embodiments, the charging dock 202 may include at least one transmitting coil 282. The at least one transmitting coil 282 may be made of different materials, including, but not limited to, copper, silver, and aluminum, or a combination thereof.

The at least one transmitting coil 282 may receive energy from a power source. In some embodiments, the at least one transmitting coil 282 may receive energy from a power source via the at least one wire 263. The at least one transmitting coil 282 may transmit energy. In some embodiments, the at least one transmitting coil 282 may transmit energy by inductive charging. In some embodiments, the at least one transmitting coil 282 may transmit energy by resonance charging. In some embodiments, the at least one transmitting coil 282 may transmit energy to the at least one charging coil 181 in the central portion 152 of the electric toothbrush 101.

A method of charging the at least one battery 157 in the electric toothbrush 101 via the charging dock 202 may include the central portion 152 of the electric toothbrush magnetically attaching to the side 203 of the charging dock 202 via the at least one magnetic member 130 in the central portion 152 of the electric toothbrush 101 and the at least one magnetic member 220 on the inner side of the side 203 of the charging dock 102. The method of charging may include the at least one wire 263 receiving energy from a power source. The method of charging may include transmitting the received energy from the at least one wire 263 to the at least one transmitting coil 282 in the charging dock 202. The method of charging may include transmitting the received energy from the at least one transmitting coil 282 in the charging dock 202 to the at least one charging coil 181 in the central portion 152 of the electric toothbrush 101. The method of charging may include transferring the received energy from the at least one charging coil 181 in the central portion 152 of the electric toothbrush 101 to the at least one battery 157 in the electric toothbrush 101.

A method of charging the at least one battery 157 in the electric toothbrush 101 via the charging dock 202 may include a metallic part of the handle portion 153 of the electric toothbrush magnetically attaching to the side 203 of the charging dock 202 via the at least one magnetic member 220 on the inner side of the side 203 of the charging dock 202. The method of charging may include the at least one wire 263 receiving energy from a power source. The method of charging may include transmitting the received energy from the at least one wire 263 to the at least one transmitting coil 282 in the charging dock 202. The method of charging may include transmitting the received energy from the at least one transmitting coil 282 in the charging dock 202 to the at least one charging coil 181 in the central portion 152 of the electric toothbrush 101. The method of charging may include transferring the received energy from the at least one charging coil 181 in the central portion 152 of the electric toothbrush 101 to the at least one battery 157 in the electric toothbrush 101.

The charging dock 202 may include at least one light 261. In some embodiments, the at least one light 261 may be an LED light. In some embodiments, the at least one light 261 may be a ring light.

The charging dock 202 may include at least one sensor 262. The at least one sensor 262 may detect whether an external light is turned on or off. The at least one sensor 262 may turn on or off the at least one light 261 in the charging dock 202. In some embodiments, the at least one sensor 262 may turn on the at least one light 261 in the charging dock 202 if an external light is turned off. In some embodiments, the at least one sensor 262 may turn off the at least one light 261 in the charging dock 202 if an external light is turned on.

In some embodiments, the at least one sensor 262 may detect whether the charging dock 202 is placed in a surrounding with insufficient light. In some embodiments, the at least one sensor 262 may turn on the at least one light 261 in the charging dock 202 if the charging dock is placed in a surrounding with insufficient light. In some embodiments, the at least one sensor 262 may turn off the at least one light 261 in the charging dock 202 if the surrounding wherein the charging dock 202 is placed has sufficient light.

In some embodiments, the at least one sensor 262 may turn on the at least one light 261 in the charging dock 202 if an external light is turned off and if the at least one battery 157 in the electric toothbrush 101 is receiving energy from the at least one charging coil 181 in the central portion 152 of the electric toothbrush 101. In some embodiments, the at least one sensor 262 may turn off the at least one light 261 in the charging dock 202 if the at least one battery 157 in the electric toothbrush 101 is fully charged.

Various modifications to the embodiments described in this disclosure will be readily apparent to those skilled in the art, and the generic principles defined herein may be applied to other embodiments without departing from the spirit or scope of this disclosure. Thus, the disclosure is not intended to be limited to the embodiments discussed herein but is to be accorded the widest scope consistent with the claims, the principles and the novel features disclosed herein. The word "example" is used exclusively herein to mean "serving as an example, instance, or illustration." Any embodiment described herein as "example" is not necessarily to be construed as preferred or advantageous over other embodiments, unless otherwise stated.

Certain features that are described in this specification in the context of separate embodiments also may be embodied in combination in a single embodiment. Conversely, various features that are described in the context of a single embodiment also may be embodied in multiple embodiments separately or in any suitable sub-combination. Moreover, although features may be described above as acting in certain combinations and even initially claimed as such, one or more features from a claimed combination may in some cases be excised from the combination, and the claimed combination may be directed to a sub-combination or variation of a sub-combination.

Similarly, while operations are depicted in the drawings in a particular order, this should not be understood as requiring that such operations be performed in the order shown or in sequential order, or that all illustrated operations be performed, to achieve desirable results. Additionally, other embodiments are within the scope of the following claims. In some cases, the actions recited in the claims may be performed in a different order and still achieve desirable results.

It will be understood by those within the art that, in general, terms used herein are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

What is claimed is:

1. An electric toothbrush and charging dock system, the system comprising an electric toothbrush and a charging dock, wherein:
    the electric toothbrush comprises:
        at least one magnetic member in a central portion thereof; and
        at least one charging coil; and
    the charging dock comprises:
        at least one transmitting coil;
        a proximal portion comprising at least one magnetic member; and
        a distal portion comprising a power plug configured to receive energy from a power source,
        wherein the proximal portion is rotatably attached to the distal portion, and wherein the proximal portion is configured to rotate in a plane, the plane parallel to the at least one charging coil with the electric toothbrush attached to the charging dock.

2. The system of claim 1, wherein the central portion of the electric toothbrush and the proximal portion of the charging dock are configured to be magnetically attachable to each other via the at least one magnetic member in the central portion of the electric toothbrush and the at least one magnetic member in the proximal portion of the charging dock.

3. The system of claim 1, wherein the distal portion of the charging dock is configured to receive energy from the power source via the power plug and transmit the received energy from the power plug to the at least one transmitting coil in the charging dock.

4. The system of claim 3, wherein the distal portion of the charging dock is further configured to transmit the received energy from the at least one transmitting coil in the charging dock to the at least one charging coil in the electric toothbrush.

5. The system of claim 4, wherein the at least one charging coil in the electric toothbrush is configured to receive energy from the at least one transmitting coil in the charging dock and to transfer the received energy to at least one battery in the electric toothbrush when the central portion of the electric toothbrush and the proximal portion of the charging dock are magnetically attached to each other.

6. The system of claim 5, wherein the energy transmitted from the at least one transmitting coil in the charging dock is received by the at least one charging coil in the electric toothbrush via inductive charging.

7. The system of claim 5, wherein the energy transmitted from the at least one transmitting coil in the charging dock is received by the at least one charging coil in the electric toothbrush via resonance charging.

8. The system of claim 1, further comprising a light.

9. The system of claim 8, further comprising a sensor configured to turn the light on or off.

10. The system of claim 9, wherein the sensor is further configured to:
    detect whether an external light is turned off; and
    turn the light on when the external light is turned off and when at least one battery in the electric toothbrush is receiving energy from the at least one charging coil in the electric toothbrush.

11. The system of claim 10, wherein the sensor is further configured to turn the light off when the external light is turned on.

12. The system of claim 10, wherein the sensor is further configured to turn the light off when the at least one battery in the electric toothbrush is fully charged.

13. The system of claim 1, wherein the central portion of the electric toothbrush comprises the at least one charging coil.

14. The system of claim 13, wherein the system comprises two magnetic members longitudinally spaced along the central portion of the electric toothbrush and the at least one charging coil is positioned longitudinally between the two magnetic members.

15. The system of claim 1, wherein the distal portion of the charging dock comprises the at least one transmitting coil.

16. The system of claim 1, wherein an angle of rotation of the proximal portion relative to the distal portion of the charging dock along an X-Y axis parallel to the distal portion of the charging dock includes a range of angles of rotation from 0 degrees to 90 degrees.

17. The system of claim 1, wherein the distal portion of the charging dock further comprises a first plurality of mating surfaces and the proximal portion of the charging dock further comprises a second plurality of mating surfaces, wherein the first plurality of mating surfaces is configured to engage the second plurality of mating surfaces to facilitate rotation.

18. The system of claim 1, wherein the proximal portion of the charging dock is rotatable relative to the distal portion of the charging dock while the proximal portion is attached to the distal portion.

19. The system of claim 1, wherein the plane is parallel to the at least one transmitting coil.

20. The system of claim 1, wherein the plane is parallel to a longitudinal extent of the electric toothbrush with the electric toothbrush attached to the charging dock.

21. A method of charging at least one battery in an electric toothbrush via a charging dock, the electric toothbrush comprising at least one magnetic member in a central portion thereof and at least one charging coil, the charging dock comprising a proximal portion comprising at least one magnetic member, a distal portion comprising at least one unit configured to receive energy from a power source, and at least one transmitting coil, the distal portion rotatably attached to the proximal portion, the method comprising:
    rotating the proximal portion in a plane that is parallel to the at least one transmitting coil;
    magnetically attaching the central portion of the electric toothbrush to the charging dock via the at least one magnetic member in the central portion of the electric toothbrush and the at least one magnetic member in the charging dock;
    receiving energy from the power source to the at least one unit;
    transmitting the received energy from the at least one unit to the at least one transmitting coil in the charging dock;
    transmitting the received energy from the at least one transmitting coil in the charging dock to the at least one charging coil in the electric toothbrush; and
    transferring the received energy from the at least one charging coil in the electric toothbrush to the at least one battery in the electric toothbrush.

22. The method of claim 21, wherein the energy is transmitted from the at least one transmitting coil in the charging dock to the at least one charging coil in the electric toothbrush via inductive charging.

23. The method of claim 21, wherein the energy is transmitted from the at least one transmitting coil in the charging dock to the at least one charging coil in electric toothbrush via resonance charging.

24. The method of claim 21, wherein the charging dock further comprises a light and a sensor configured to turn the light on or off, the method further comprising:
    the sensor detecting whether an external light is turned off; and
    turning the light on when the external light is turned off and when the at least one battery in the electric toothbrush is receiving energy from the at least one charging coil in the electric toothbrush.

25. The method of claim 24, further comprising the sensor turning the light off when the external light is turned on.

26. The method of claim 24, further comprising the sensor turning the light off when the at least one battery in the electric toothbrush is fully charged.

\* \* \* \* \*